United States Patent
Xing et al.

(10) Patent No.: US 9,359,478 B2
(45) Date of Patent: Jun. 7, 2016

(54) CURABLE COMPOSITIONS FOR LED ENCAPSULANTS COMPRISING A POLYCARBOSILANE AND A HYDROSILICONE

(71) Applicant: Henkel AG & Co. KGaA, Duesseldorf (DE)

(72) Inventors: Thomas Xing, Shanghai (CN); Liwei Zhang, Shanghai (CN); Pasing Zhiming Li, Shanghai (CN); Yong Zhang, Shanghai (CN); Juan Du, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/609,984

(22) Filed: Jan. 30, 2015

(65) Prior Publication Data

US 2015/0148510 A1   May 28, 2015

Related U.S. Application Data

(63) Continuation of application No. PCT/CN2012/079587, filed on Aug. 2, 2012.

(51) Int. Cl.
| | |
|---|---|
| *C08G 77/04* | (2006.01) |
| *C08K 5/5425* | (2006.01) |
| *C08L 83/16* | (2006.01) |
| *C08G 77/60* | (2006.01) |
| *C08G 77/12* | (2006.01) |
| *C08G 77/20* | (2006.01) |

(52) U.S. Cl.
CPC .............. *C08G 77/04* (2013.01); *C08K 5/5425* (2013.01); *C08L 83/16* (2013.01); *C08G 77/12* (2013.01); *C08G 77/20* (2013.01); *C08G 77/60* (2013.01)

(58) Field of Classification Search
CPC ......... C08G 77/50; C08G 77/52; C08G 77/12
See application file for complete search history.

(56) References Cited

U.S. PATENT DOCUMENTS

| 5,691,433 A | 11/1997 | Kotani et al. |
|---|---|---|
| 2007/0249790 A1 | 10/2007 | Kashiwagi et al. |
| 2008/0160322 A1 | 7/2008 | Mochizuki et al. |
| 2010/0267913 A1* | 10/2010 | Kolel-Veetil .......... C08F 230/08 526/279 |

FOREIGN PATENT DOCUMENTS

| EP | 0927736 A1 | 7/1999 |
|---|---|---|
| EP | 1767580 A1 | 3/2007 |
| EP | 2032653 B1 | 12/2009 |
| JP | 200784766 A | 4/2007 |
| KR | 1020100030959 A | 3/2010 |
| WO | 2006055231 A1 | 5/2005 |
| WO | 2006013066 A2 | 2/2006 |
| WO | 2007148812 A1 | 12/2007 |
| WO | 2008023537 A1 | 2/2008 |
| WO | 2009131023 A1 | 10/2009 |

* cited by examiner

Primary Examiner — Kuo-Liang Peng
(74) Attorney, Agent, or Firm — James E. Piotrowski

(57) ABSTRACT

The present invention provides a curable composition, comprising:

(A) at least one polycarbosilane A represented by the following formula (1):

$$[R^1R^2R^3SiX_{1/2}]_M[R^4R^5SiX_{2/2}]_D[R^6SiX_{3/2}]_T[SiX_{4/2}]_Q \quad (1),$$

(B) at least one organopolysiloxane B represented by the following formula (2):

$$[R^7R^8R^9SiO_{1/2}]_M[R^{10}R^{11}SiO_{2/2}]_D[R^{12}SiO_{3/2}]_T[SiO_{4/2}]_Q, \quad (2),$$

and (C) at least a catalyst, as well as a cured product obtainable by heating such composition, and the use of the composition as semiconductor encapsulating material and/or electronic elements packaging material.

16 Claims, No Drawings

CURABLE COMPOSITIONS FOR LED ENCAPSULANTS COMPRISING A POLYCARBOSILANE AND A HYDROSILICONE

FIELD OF THE INVENTION

The present invention relates to curable compositions comprising a combination of at least one polycarbosilane comprising vinyl functionality and at least one organopolysiloxane comprising hydrogen functionality, and light emitting devices encapsulated with products prepared by curing these compositions. More particularly, the invention relates to hydrosilylation-curable compositions that cure to form polycarbosilane/polysiloxane products having optical clarity, resistance to high temperature, and very good moisture and gas barrier properties. This invention further relates to reliable light emitting devices encapsulated with these compositions.

BACKGROUND ART

Light emitting diodes (LEDs) have a variety of favorable properties including long life, high brightness, low voltage, and small size, an almost complete absence of heat rays during use, and good retention of light emitting efficiency even at low temperature.

In a light emitting device such as a light emitting diode (LED), a composition for sealing a light emitting element is required not only to protect the light emitting element from external influences but also to provide satisfactory and stable adhesiveness of the light emitting element to a support substrate of polyphthalamide, ceramics, or the like, supporting the light emitting element. The composition needs also to have high transparency so as not to decrease luminance of the light emitting element.

As such a sealing composition, for example, epoxy resin and the like have been conventionally used. However, recently LEDs have become more and more efficient, resulting in increased luminance, increased heat generation during use and emission of light of shorter wavelength, and thus the use of the epoxy resin has been a cause of cracking and yellowing.

Therefore, organopolysiloxane compositions (silicone compositions) have been used because of their excellence in heat resistance and ultraviolet resistance. In particular, addition-reaction type silicone compositions curing via hydrosilylation reaction have been widely used since they are excellent in productivity because of their quick curability by heating and avoidance of formation of any byproduct when cured.

Many references deal with such silicone compositions and their use for LED manufacturing.

WO 2008023537 A1 describes a curable organopolysiloxane composition comprising at least the following components: (A) a linear diorganopolysiloxane with a mass average molecular weight of at least 3,000, (B) a branched organopolysiloxane, (C) an organopolysiloxane having, on average, at least two silicon-bonded aryl groups and, on average, at least two silicon-bonded hydrogen atoms in one molecule, and (D) a hydrosilylation reaction catalyst; this composition has excellent curability and, when cured, forms a flexible cured product of high refractive index, optical transmissivity, excellent adherence to various substrates, high hardness and slight surface tack.

EP 2032653 B1 discloses a curable organopolysiloxane composition comprising at least the following components: an organopolysiloxane (A) represented by the following general formula: $R^1_3SiO(R^1_2SiO)_mSiR^1_3$ (where $R^1$ is a monovalent hydrocarbon group, and "m" is an integer from 0 to 100); an organopolysiloxane (B) represented by the following average unit formula: $(R^2SiO_{3/2})_a(R^2_2SiO_{2/2})_b(R^2_3SiO_{1/2})_c$ (where $R^2$ is a monovalent hydrocarbon group, and "a", "b", and "c" are specific numbers); an organopolysiloxane (C) having in one molecule on average at least two silicon-bonded aryl groups and on average at least two silicon-bonded hydrogen atoms; and a hydrosilylation-reaction catalyst (D); this composition is characterized by good gap filling properties and curability and, upon curing, forms a cured body that possesses a high refractive index, high light transmissivity, and strong adhesion to various substrates.

US 20070249790 A1 describes a colorless transparent silicone lens produced by thermally curing a silicone resin composition comprising (A) an organopolysiloxane having a resin structure comprising $R^1SiO_{1.5}$ units, $R^2_2SiO$ units, and $R^3_aR^4_bSiO_{(4-a-b)/2}$ units, wherein $R^1$, $R^2$, and $R^3$ are independently a methyl group, an ethyl group, a propyl group, a cyclohexyl group, or a phenyl group, $R^4$ is a vinyl group or an allyl group, a is 0, 1, or 2, b is 1 or 2, and a+b is 2 or 3, and wherein the number of repetition of the $R^2_2SiO$ unit is 5 to 300, (B) an organohydrogen polysiloxane having a resin structure comprising $R^1SiO_{1.5}$ units, $R^2_2SiO$ units, and $R^3_cH_dSiO_{(4-c-d)/2}$ units, wherein c is 0, 1, or 2, d is 1 or 2, and c+d is 2 or 3, and wherein the number of repetition of the $R^2_2SiO$ unit is 5 to 300, and (C) a platinum group catalyst. This composition shows excellent flexibility, transparency, and moldability as well as reduced surface tackiness is provided.

US 20080160322 A1 describes a silicone composition for sealing a light emitting element including (A) a vinyl group-containing organopolysiloxane having a three-dimensional network structure represented by the average unit formula $(SiO_{4/2})_a(ViR_2SiO_{1/2})_b(R_3SiO_{1/2})_c$, wherein Vi represents a vinyl group, R's are identical or different substituted or unsubstituted monovalent hydrocarbon groups other than alkenyl groups, and a, b, and c are positive numbers satisfying that a/(a+b+c) is 0.2 to 0.6 and b/(a+b+c) is 0.001 to 0.2; (B) an organohydrogenpolysiloxane containing at least two hydrogen atoms per molecule, each hydrogen atom being bonded to a silicon atom, the organohydrogenpolysiloxane being contained in such an amount that the amount of hydrogen atoms bonded to a silicon atom is 0.3 to 3.0 mol per 1 mol of a vinyl group bonded to a silicon atom in the component (A); and (C) a catalytic amount of a hydrosilylation catalyst, wherein the coefficient of linear expansion of the composition after curing is $10\times10^{-6}$ to $290\times10^{-6}/°$ C. It is possible to obtain a cured product whose residual stress with a support substrate is reduced and which has long-term satisfactory and stable adhesiveness.

EP 1767580 A1 discloses an addition reaction curing silicone composition, comprising an organopolysiloxane, wherein some of the silicon atoms may be linked via bivalent hydrocarbon groups of 2 to 10 carbon atoms. However, at least 80 mol-% of all groups bridging two silicon atoms have to be oxygen atoms, i.e. the polymeric backbone predominantly consists of siloxane units with only few silalkylene or silarylene units being allowed. The composition is said to be particularly useful as a sealing material for photo devices such as LEDs, as well as lens material or hard coating agent or the like.

KR 20100030959 A teaches polysiloxanes for sealing materials or a lens of a LED. The polysiloxanes comprise a repeating unit $[-Si(R1)(R2)-X1-C_6H_4-Y1-]_m$, wherein R1 and R2 are independently H, methyl, ethyl, phenyl or C2-C6 alkenyl; X1 and Y1 are independently C0-C6 alkylene, C2-C6 alkenylene, C2-C6 alkynylene, NH or O; and m is 1 or more. The presence of siloxane units is not excluded.

From WO 2009/131023 A1 silicon-containing polymers are known comprising —R2-C$_6$H$_4$—R$_2$-units bridging neighboring silicon atoms, wherein R2 designates identical or different, substituted or unsubstituted alkylene groups. The silicon-containing polymers further comprise siloxane units. The molar amount of units comprising said —R$_2$—C$_6$H$_4$—R$_2$-bridges within the silicon-containing polymer is below 10%. The polymers may be used in curable polymer compositions suitable for obtaining a cured product characterized by a high index of refraction. Such compositions are useful as a sealant for optical devices such as LEDs and for use in optical instruments.

From the above documents, it can be seen that silicone compositions are widely used as LED encapsulant material. However, since silicone compositions have large free volume as an inherent property, they show much worse gas and moisture barrier properties than epoxy based materials. Thus, moisture penetrates more easily through the encapsulating material resulting in the corrosion of LED chips, which greatly influences the durability of LEDs.

Therefore, it is a great challenge to develop an LED encapsulant with both very good gas and moisture barrier properties and at the same time thermal stability equal to the stability of silicone compositions.

SUMMARY OF THE INVENTION

The object of the invention is to provide a composition, which is curable via hydrosilylation and after curing exhibits high transparency, heat stability, and very good gas and moisture barrier properties. The inventors found that Si-[bivalent hydrocarbon group]-Si bonds, and in particular Si—C$_2$H$_4$—Si bonds and Si—C$_6$H$_4$—Si bonds are very stable even at high temperature, and hence, such bonds are used to build up the backbones of polymers useful for this invention. Such polymers comprise in the backbone solely silicon atoms which are linked via said bivalent hydrocarbon groups and, hence, such polymers are called in the following polycarbosilanes. The objects of the invention are achieved by providing a composition as set forth hereinafter.

In a first aspect the invention relates to a curable composition, in particular a transparent LED encapsulant composition, comprising:
(A) at least one polycarbosilane A represented by the following formula (1):

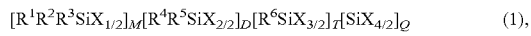
 (1), wherein R$^1$, R$^2$, R$^3$, R$^4$, R$^5$, and R$^6$, each independently designates a methyl group, an ethyl group, a vinyl group, or a phenyl group, with the proviso that each molecule comprises at least 2 vinyl groups; each X independently designates a bivalent C$_2$H$_4$ hydrocarbon group or phenylene; and M, D, T, and Q each represents a number ranging from 0 to less than 1, provided that M+D+T+Q is 1,
(B) at least one organopolysiloxane B represented by the following formula (2):

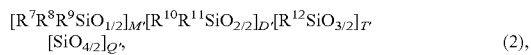
 (2), wherein R$^7$, R$^8$, R$^9$, R$^{10}$, R$^{11}$, and R$^{12}$, each independently designates a methyl group, an ethyl group, a vinyl group, a phenyl group, or hydrogen, with the proviso that each molecule comprises at least 2 hydrogen atoms directly bonded to silicon; and M', D', T', and Q' each represents a number ranging from 0 to less than 1, provided that M'+D'+T'+Q' is 1, and
(C) at least a catalyst.

The organopolysiloxane B comprises hydrogen atoms directly bonded to silicon and, hence, may also be called organohydrogenpolysiloxane or hydrosilicone.

Furthermore, the present invention relates to a cured composition obtainable by heating a composition according to the present invention, as well as to the use of a composition according to the present invention as semiconductor encapsulating material and/or electronic elements packaging material.

DETAILED DESCRIPTION

The composition according to the invention comprises a polycarbosilane A represented by formula (1) and a organopolysiloxane B represented by formula (2). In both cases the polymer comprises different "units", wherein a unit is understood to be a structural motive which is formed of 1 silicon-atom and—according to the number of valencies at the silicon-atom—4 bridging groups X or O and remaining groups R, respectively, being directly bonded to the silicon-atom. A unit having only one bridging group is also called mono-functional or M-unit. A unit having two bridging groups is called di-functional or D-unit, a unit having three bridging groups tri-functional or T-unit, and a unit having four bridging groups tetra-functional or Q-unit. The number of specific units being present in a particular polymer is represented by the indices M and M', D and D', T and T', and Q and Q'.

It is understood that the bridging units X can be different not only within the various types of units of a particular polycarbosilane but also within various units of one and the same type and even within one single unit. Thus, e. g. a D-unit comprising two bridging groups, like the [R$^4$R$^5$SiX$_{2/2}$] unit in formula (1), may contain two identical bridging groups, namely 2/2 bivalent C$_2$H$_4$ groups or 2/2 phenylene groups. However, such unit may also comprise ½ bivalent C$_2$H$_4$ group and ½ phenylene group. The corresponding applies to the bridging groups in T-, and Q-units.

The polycarbosilane A substantially is a liquid or solid polycarbosilane with linear or branched structure represented by the average compositional formula (1) as set forth above.

Preferably, the polycarbosilane A has a branched structure, i.e. corresponds to formula (1), wherein T+Q is greater than 0.

It is preferred that the weight average molecular weight of the polycarbosilane according to the present invention is 100-300,000 g/mol, preferably 1,000-50,000 g/mol (GPC, standard: polystyrene). Their viscosity is preferably 0.1-100 Pa·s at 25° C. and more preferably 0.5-50 Pa·s at 25° C. (Brookfield DV-+Digital Viscometer/LV, (spindle S64, rotation speed 50 rpm)).

In formula (1) X preferably designates a bivalent C$_2$H$_4$ hydrocarbon group.

A "curable composition" is understood to be a mixture of two or more substances which mixture can be converted from a soft state into a harder state by means of physical or chemical actions. Those physical or chemical actions can consist, for example, in the delivery of energy in the form of heat, light, or other electromagnetic radiation, but also in simply bringing into contact with atmospheric moisture, water, or a reactive component. Preferably, the composition of the present invention is heat-curable.

The curable composition of the invention further comprises at least an organopolysiloxane B represented by formula (2). Such organopolysiloxane comprises at least two hydrogen atoms directly bonded to silicon per molecule.

The organopolysiloxane B substantially is a liquid or solid polycarbosilane with linear or branched structure. Preferably, it has a linear structure, i.e. corresponds to formula (2), wherein T'+Q' is 0, and D' is greater than 0.

It is preferred that the weight average molecular weight of the organopolysiloxane B is 1,000-300,000 g/mol, and more preferred 10,000-100,000 g/mol (GPC, standard: polystyrene). Their viscosity is preferably 0.1-100 Pa·s at 25° C. and more preferably 0.5-50 Pa·s at 25° C. (Brookfield DV-+Digital Viscometer/LV, (spindle S64, rotation speed 50 rpm)).

The curable composition preferably comprises an organopolysiloxane B comprising 0.8-8 mmol/g silicon-bonded hydrogen atoms.

The curable composition preferably comprises polycarbosilane A and organopolysiloxane B in respective amounts to provide a molar ratio of silicon-bonded hydrogen atoms (i.e. SiH groups) resulting from the presence of any organopolysiloxane B to silicon-bonded vinyl groups resulting from the presence of any poylcarbosilane A in the range of 0.5 to 10, more preferably of 0.8 to 4, and most preferably of 1 to 3. In other words the Si—H/Si-Vinyl ratio is preferably 0.5-10, more preferably 0.8-4.0, and most preferably 1.0-3.0.

The curable composition furthermore comprises at least a catalyst. As catalyst any compound may be used which is able to promote the hydrosilylation addition reaction between vinyl and/or allyl groups in polycarbosilane A and Si—H groups in oraganopolysiloxane B. Typical addition reaction catalysts are platinum group metal catalysts including platinum catalysts, such as the reaction products of chloroplatinic acid with monohydric alcohols, complexes of chloroplatinic acid with olefins, and platinum bisacetoacetate, as well as palladium catalysts and rhodium catalysts.

Preferably, the catalyst is one or more compound selected from the group consisting of platinum group metal catalysts.

There are no specific restrictions with regard to the amount of the catalyst used, provided that it is added in a catalytic amount sufficient for accelerating the desired hydrosilylation reaction. The addition reaction catalyst preferably is used in such an amount to give about 1 to 500 ppm, especially about 2 to 100 ppm of metal, especially of platinum group metal, based on the total weight of the curable composition. The term "metal" or "platinum group metal", respectively, only refers to the content of the metal itself, even if in the curable composition the metal is present as a complex compound.

The curable composition of the invention may be prepared by simply mixing all ingredients. A thus prepared mixture is ready to be applied and to be cured, e.g. by applying heat.

However, in one embodiment of the invention the composition is a two-component preparation consisting of component 1 and component 2, wherein component 1 comprises polycarbosilane A and the total amount of catalyst being present and component 2 comprises the total amount of organopolysiloxane B being present and optionally further polycarbosilane A. Each component may be filled in a different container, e.g. a tube or jar, or a different compartment of a two-compartment container, e.g. a two-chamber tube. This allows to safely storing the composition without causing premature curing. Component 1 and component 2 are kept separately until application. To apply the composition, component 1 and component 2 are mixed and the mixture is applied to the desired place.

In addition to the components (A) to (C) described above, the composition according to the present invention may further comprise optional components insofar as the objects of the invention are not compromised.

Possible optional components include addition reaction inhibitors for adjusting curing time and imparting a pot life, and adhesion promoters to improve the adhesive properties of the composition.

Suitable reaction inhibitors include ethynylcyclohexanol, 2-methyl-3-butyn-2-ol, 3,5-dimethyl-1-hexyn-3-ol, 2-phenyl-3-butyn-2-ol, or similar alkyne alcohols; 3-methyl-3-penten-1-yne, 3,5-dimethyl-3-hexen-1-yne, or a similar enyne compound; 1,3,5,7-tetramethyl-1,3,5,7-tetravinyl-cyclotetrasiloxane, 1,3,5,7-tetramethyl-1,3,5,7-tetrahexenyl-cyclotetrasiloxane, benzotriazole, or the like. There are no special restrictions with regard to the quantities in which these inhibitors can be added but it is preferred that in term of weight units these inhibitors are added in a quantity of 10 to 1,000 ppm per weight of the composition.

An adhesion promoter is understood to mean a substance that improves the adhesion properties of the composition on surfaces. Conventional adhesion promoters (tackifiers) known to the person skilled in the art can be used individually or as a combination of several compounds. Suitable examples include resins, terpene oligomers, coumarone/indene resins, aliphatic petrochemical resins and modified phenolic resins. Suitable within the framework of the present invention are, for example, hydrocarbon resins, as obtained by polymerization of terpenes, mainly α- or β-pinene, dipentene or limonene. Polymerization of these monomers is usually cationic with initiation using Friedel-Crafts catalysts. The terpene resins also include copolymers of terpenes and other monomers, such as styrene, α-methylstyrene, isoprene and the like. The above-mentioned resins are used, for example, as adhesion promoters for pressure-sensitive adhesives and coating materials. Also suitable are the terpene phenolic resins, which are produced by acid-catalyzed addition of phenols to terpenes or rosin. Terpene phenolic resins are soluble in most organic solvents and oils and miscible with other resins, waxes and rubber. Also suitable as adhesion promoters within the framework of the present invention in the above sense are the rosins and their derivatives, such as esters or alcohols thereof. Particularly suitable are silane adhesion promoters, in particular aminosilanes and epoxysilanes, for example 3,4-epoxycyclohexylethyl trimethoxysilane.

In a specific embodiment of the curable composition according to the invention, the composition comprises an aminosilane of the general formula (3)

R'R''N—R—SiX'Y'Z'     (3)

as an adhesion promoter, in which
R' and R'' are, independently of one another, hydrogen or $C_1$-$C_8$ alkyl residues,
R is a divalent hydrocarbon residue having 1-12 C atoms optionally containing a heteroatom, and
X', Y', Z' are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group. Such compounds inherently exhibit a high affinity to the binding polymer components of the curable composition according to the invention, but also to a wide range of polar and non-polar surfaces and therefore contribute to the formation of particularly stable adhesion between the cured composition and the substrates to be bonded or encapsulated in each case.

The linking group R can be, for example, a straight-chained or branched or cyclic, substituted or unsubstituted alkylene residue. As a heteroatom, nitrogen (N) or oxygen (O) is optionally contained therein. If X', Y' and/or Z' are an acyloxy group, this can be, for example, the acetoxy group —OCO—$CH_3$.

Insofar as transparency is not impaired, there may be blended inorganic fillers for enhancing the strength of the composition.

Suitable fillers for the composition according to the invention are, for example, chalk, lime powder, precipitated and/or pyrogenic silica, zeolites, bentonites, magnesium carbonate, kieselguhr, alumina, clay, talc, titanium oxide, iron oxide, zinc oxide, sand, quartz, flint, mica, glass powder and other ground minerals. In addition, organic fillers, especially carbon black, graphite, wood fibers, wood flour, sawdust, wood pulp, cotton, pulp, wood chips, chopped straw, chaff, ground walnut shells and other chopped fibers, can also be used. Furthermore, short fibers such as glass fiber, glass filament, polyacrylonitrile, carbon fiber, Kevlar fiber or polyethylene fibers can also be added. Aluminum powder is also suitable as filler. In addition, hollow spheres with a mineral shell or a plastic shell are suitable as fillers. These can be, for example, hollow glass spheres, which are commercially available with the trade names Glass Bubbles®. Hollow spheres based on plastics are available for example under the trade names Expancel® or Dualite®. These are composed of inorganic or organic substances, each having a diameter of 1 mm or less, preferably of 500 μm or less. For some applications, fillers which impart thixotropy to the preparations are preferred. Such fillers are also described as rheological auxiliaries, e.g. hydrogenated castor oil, fatty acid amides or swellable plastics such as PVC. So that they can be pressed out readily from a suitable metering device (e.g. tube), such preparations have a viscosity of 3,000 to 15,000, preferably 4,000 to 8,000 mPas or 5,000 to 6,000 mPas.

The fillers may be used in a quantity of 1 to 80 wt. %, based on the total weight of the composition. A single filler or a combination of several fillers can be used.

In a preferred embodiment of the composition according to the invention, the filler is highly dispersed silica having a BET surface area of from 10 to 90 $m^2/g$, in particular from 35 to 65 $m^2/g$. When silica of this type is used, it does not cause a substantial increase in the viscosity of the composition according to the invention but contributes to a reinforcement of the cured composition. By means of this reinforcement, for example, the initial strengths, shear strengths and the adhesion of the adhesives, sealants or coating compositions in which the composition according to the invention is used are improved.

Particularly preferably, highly dispersed silica having a BET surface area of 45 to 55 $m^2/g$, in particular having a BET surface area of about 50 $m^2/g$, is used. Such silicas have the added advantage of a 30 to 50% shorter incorporation time in comparison to silicas with a higher BET surface area. Another advantage lies in the fact that said highly dispersed silica can be incorporated at a considerably higher concentration without the transparency and the flow properties of the compositions being impaired. Particular preference is also given to an embodiment of the composition according to the invention in which the filler is highly dispersed silica with a mean particle size $d_{50}$, measured by laser diffraction, of less than 25 μm, preferably from 5 to 20 μm. A filler of this type is especially suitable where highly transparent, clear compositions are needed for particularly demanding applications. It is also conceivable to use pyrogenic and/or precipitated silicas with a relatively high BET surface area, advantageously with 100-250 $m^2/g$, in particular 110-170 $m^2/g$, as filler. The incorporation of such silicas, however, takes a comparatively long time and is therefore more costly. In addition, significant quantities of air are introduced into the product, which has to be removed again in a complicated and time-consuming manner. On the other hand, the effect of a reinforcement of the cured composition due to the higher BET surface area can be achieved with a smaller proportion by weight of silica. In this way, additional substances can be introduced to improve the preparation according to the invention with regard to other requirements.

In the event that a basic filler is to be used instead of acidic fillers, for example calcium carbonates (chalks) are suitable, in which case cubic, non-cubic, amorphous and other modifications can be used. Preferably, the chalks used are surface treated or coated. As a coating agent, preferably fatty acids, fatty acid soaps and fatty acid esters are used, for example lauric acid, palmitic acid or stearic acid, sodium or potassium salts of such acids or their alkyl esters. In addition, however, other surface-active substances, such as sulfate esters of long-chain alcohols or alkylbenzenesulfonic acids or their sodium or potassium salts or coupling reagents based on silanes or titanates, are also suitable. The surface treatment of chalks is often associated with an improvement in processability and adhesive strength and also the weathering resistance of the compositions. The coating composition is usually used in a proportion of 0.1 to 20 wt %, preferably 1 to 5 wt %, based on the total weight of the crude chalk.

Depending on the desired property profile, precipitated or ground chalks can be used. Ground chalks can be produced, for example, from natural lime, limestone or marble by mechanical grinding, using either dry or wet methods. Depending on the grinding process, fractions having different average particle sizes can be obtained. Advantageous specific surface area values (BET) are between 1.5 $m^2/g$ and 50 $m^2/g$.

If desired, phosphor and antidegradants may also be added.

Further auxiliary substances and additives include plasticizers, stabilizers, antioxidants, reactive diluents, drying agents, UV stabilizers, anti-ageing agents, rheological auxiliaries, fungicides and/or flame retardants.

Curing of the compositions according to the invention typically involves heating at 50 to 200° C., and particularly at 70 to 160° C., for 1 to 60 minutes, and particularly for 2 to 30 minutes. Furthermore, post-curing may also be conducted at 50 to 200° C., and particularly at 70 to 160° C., for 0.1 to 10 hours, and particularly for 1 to 4 hours.

Furthermore, the invention relates to cured products obtainable by heating a curable composition according to the invention.

A further subject matter of the present invention is the use of a curable composition according to the invention in encapsulation, sealing, protection, bonding and/or lens formation materials, in particular as semiconductor encapsulating material and/or electronic elements packaging material. The composition of the invention can provide enhanced barrier properties against moisture and gases. In particular, the composition according to the invention is advantageously used in encapsulation materials for the encapsulation of semiconductor devices, especially of light emitting devices (LEDs).

EXAMPLES

In the following particular aspects of the present invention are further described using a series of examples, however, the present invention is in no way restricted to these examples.

Test Methods

The evaluations were conducted in the manner described below.

In the following examples, weight average molecular weight values (g/mol) are polystyrene-equivalent values measured using gel permeation chromatography (GPC).

Vinyl content was titrated according to Chinese Chemical Industry Standard HG/T 3312-2000.

Hydrogen content was titrated as disclosed in Feng S. Y.; Zhang, J.; Li, M. J.; Zhu, Q. Z.; Organosilicon Polymer and Application Thereof, p. 400-401; Chemical Industry Press.

Transmittance was measured by an UV-Visible spectrum analyzer Lambda 650S manufactured by PerkinElmer Corporation. The transmittance was measured for the range from 300 nm to 800 nm, and the value at 450 nm was recorded as the transmittance.

Permeation was measured by Mocon Permatran-W® model 3/33 at 50° C./100% RH (RH=relative humidity).

To test cracking and lamination behavior 3 samples of each composition to be tested were used. Each sample was prepared by curing the composition in an LED cup under below mentioned conditions. If one or more of the samples cracked during hardening, the composition was evaluated as "poor", if no sample cracked, the composition was evaluated as "good". If one or more of the test pieces was found delaminated from the LED cup, the composition was evaluated as "delamination", if no test piece delaminated, the composition was evaluated as "no delamination"

Raw Materials

Divinyldimethylsilane (CAS 10519-87-6) was purchased from Ruilijie Chemical Company. Diphenylsilane (CAS: 775-12-2) and trivinylmethylsilane (CAS: 18244-95-6) was purchased from Gelest. Platinum catalyst SIP 6832.2 (2.0-2.3% platinum concentration in cyclic methylvinylsiloxanes, CAS: 68585-32-0) was purchased from Gelest. HPM-502 (a hydride terminated methylhydrosiloxane-phenylmethylsiloxane copolymer having a viscosity of 100 mPa*S, and a weight average weight of 1359 g/mol, a hydrogen content of 6.06 mmol/g, and a phenyl content of 35.4 weight-%) was purchased from Gelest.

Synthesis Example 1

(Vinylpolycarbosilane (VPCS), Linear)

Into a 100 mL dry and clean two-neck round bottom flask were added 9.22 g diphenylsilane, 6.16 g divinyldimethylsilane, 0.008 g platinum catalyst SIP 6832.2 and 6.28 g xylene. A magnetic stirrer was added and the flask was capped with a stopper and a condenser. With stirring the mixture was heated to 75° C. and kept at this temperature for 1 h, followed by further heating to 130° C. for 6 h. The unreacted monomer was removed by rotary evaporation at 115° C. and 20 mbar for 1 h and subsequently at 135° C. and 5 mbar for another hour. The obtained liquid had a weight average molecule weight of 3072 g/mol, and its vinyl content was 0.65 mmol/g.

The obtained polymer has an average formula of

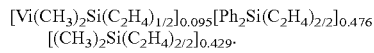

Synthesis Example 2

VPCS, Branched

Into a 100 mL dry and clean two-neck round bottom flask were added 9.22 g diphenylsilane, 7.44 g trivinylmethylsilane, 0.016 g platinum catalyst SIP 6832.2 and 6.28 g toluene. A magnetic stirrer was added and the flask was capped with a stopper and a condenser. With stirring the mixture was heated to 75° C. and kept at this temperature for 1 h, followed by further heating to 130° C. for 6 h. The unreacted monomer was removed by rotary evaporation at 115° C. and 20 mbar for 1 h and subsequently at 135° C. and 5 mbar for another hour. The obtained liquid polymer has a branched structure, a weight average molecule weight of 1662 g/mol, and its vinyl content was 3.6 mmol/g.

Application Example 1

100 g vinylpolycarbosilane of synthesis example 1, 21.5 g organohydrogenpolysiloxan HPM-502, 0.001 g platinum catalyst SIP 6832.2, and 0.001 g of the inhibitor 3,5-dimethyl-1hexyn-3-ol were mixed. The resulting mixture was heated at 150° C. for 2 hours to yield a cured product. The product was evaluated regarding permeation, cracking, adhesion/lamination, initial transparency at 450 nm (T@450 nm (initial)), and transparency at 450 nm after heat treatment of the product at 150° C. for 100 hours (T@450 nm (150° C., 100 hours)). The results are shown in Table 1.

Application Example 2

100 g vinylpolycarbosilane of synthesis example 2, 55 g organohydrogenpolysiloxan HPM-502, 0.001 g platinum catalyst SIP 6832.2, and 0.001 g of the inhibitor 3,5-dimethyl-1hexyn-3-ol were mixed. The resulting mixture was heated at 150° C. for 2 hours to yield a cured product. The resulting mixture was heated at 150° C. for 2 hours to yield a cured product. The product was evaluated regarding permeation, cracking, adhesion/lamination, initial transparency at 450 nm (T@450 nm (initial)), and transparency at 450 nm after heat treatment of the product at 150° C. for 100 hours (T@450 nm (150° C., 100 hours)). The results are shown in Table 1.

Comparative Example 1

The two components A and B of a high RI (refractive index) encapsulating material commercially available from Dow Corning under the name 6636 were mixed at a weight ratio of A:B=1:2 and heated at 70° C. for 1 hour, 120° C. for 1 hour and finally 150° C. for 1 hour. The resulting cured product was evaluated regarding permeation, cracking, adhesion/lamination, initial transparency at 450 nm (T@450 nm (initial)), and transparency at 450 nm after heat treatment of the product at 150° C. for 100 hours (T@450 nm (150° C., 100 hours)). The results are shown in Table 1.

TABLE 1

| Item | Application example 1 | Application example 2 | Comparative example 1 |
| --- | --- | --- | --- |
| Cracking | No cracks | No cracks | No cracks |
| Adhesion/Lamination | No delamination | No delamination | No delamination |
| Permeation (50° C.) (g · mil/100 inch² · day) | 54.3 | 50.2 | 80 |
| T@450 nm (initial) | 90% | 89% | 90% |
| T@450 nm (150° C., 100 hours) | 85% | 85% | 88% |

As can be seen from the results given in Table 1 cured products according to the invention show improved permeation behavior compared to cured products obtainable from commercially available encapsulating materials based solely on organopoly-siloxanes. Thermal stabilities are comparable.

What is claimed is:

1. A curable composition, comprising:
   (A) at least one polycarbosilane A represented by the following formula (1):

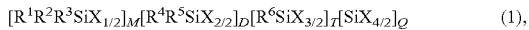
   $$[R^1R^2R^3SiX_{1/2}]_M[R^4R^5SiX_{2/2}]_D[R^6SiX_{3/2}]_T[SiX_{4/2}]_Q \qquad (1),$$

wherein $R^1$, $R^2$, $R^3$, $R^4$, $R^5$, and $R^6$, each independently designates a methyl group, an ethyl group, a vinyl group, or a phenyl group, with the proviso that each molecule comprises at least 2 vinyl groups; each X independently designates a bivalent $C_2H_4$ hydrocarbon group or phenylene; and M, D, T, and Q each represents a number ranging from 0 to less than 1, provided that M+D+T+Q is 1, (B) at least one organopolysiloxane B represented by the following formula (2):

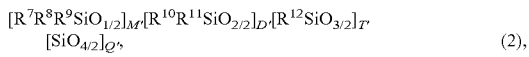
   $$[R^7R^8R^9SiO_{1/2}]_{M'}[R^{10}R^{11}SiO_{2/2}]_{D'}[R^{12}SiO_{3/2}]_{T'}[SiO_{4/2}]_{Q'}, \qquad (2),$$

wherein $R^7$, $R^8$, $R^9$, $R^{10}$, $R^{11}$, and $R^{12}$, each independently designates a methyl group, an ethyl group, a vinyl group, a phenyl group, or hydrogen, with the proviso that each molecule comprises at least 2 hydrogen atoms directly bonded to silicon; and M', D', T', and Q' each represents a number ranging from 0 to less than 1, provided that M'+D'+T'+Q' is 1, and (C) at least a catalyst.

2. The composition according to claim 1, comprising a polycarbosilane A represented by the formula (1), wherein T+Q is greater than 0.

3. The composition according to claim 1, wherein the weight average molecular weight of the polycarbosilane A is 100-300,000 g/mol.

4. The composition according to claim 1, comprising an organopolysiloxane B represented by the formula (2), wherein D' is greater than 0.

5. The composition according to claim 1, wherein polycarbosilane A and organopolysiloxane B is present in respective amounts to provide a molar Si—H/Si-Vinyl ratio of 0.5-10.

6. The composition according to claim 1, wherein the weight average molecular weight of the organopolysiloxane B is 1,000-300,000 g/mol.

7. The composition according to claim 1, wherein the catalyst is one or more selected from the group consisting of platinum group metal catalysts.

8. The composition according to claim 1, wherein the catalyst is present in such an amount that the content of the catalytic metal is in the range of 1 to 500 ppm based on the total weight of the curable composition.

9. The composition according to claim 1, wherein the composition is a two-component preparation consisting of component 1 and component 2, wherein component 1 comprises polycarbosilane A and the total amount of catalyst being present and component 2 comprises the total amount of organopolysiloxane B being present and optionally further polycarbosilane A.

10. A cured product obtainable by heating a curable composition according to claim 1.

11. A semiconductor encapsulating material and/or electronic elements packaging material comprising the composition according to claim 1.

12. A semiconductor and/or electronic element comprising cured reaction products of the composition according to claim 1.

13. The composition according to claim 1, wherein the weight average molecular weight of the polycarbosilane A is 1,000-50,000 g/mol.

14. The composition according to claim 1, wherein polycarbosilane A and organopolysiloxane B is present in respective amounts to provide a molar Si—H/Si-Vinyl ratio of 1.0-3.0.

15. The composition according to claim 1, wherein the weight average molecular weight of the organopolysiloxane B is 10,000-100,000 g/mol.

16. The composition according to claim 1, wherein the catalyst is present in such an amount that the content of the catalytic metal is in the range of 2 to 100 ppm, based on the total weight of the curable composition.

* * * * *